United States Patent
Ogawa

(10) Patent No.: US 7,252,388 B2
(45) Date of Patent: Aug. 7, 2007

(54) PROJECTOR WITH TILT-ANGLE DETECTING CAPABILITY

(75) Inventor: Masahiro Ogawa, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 10/866,299

(22) Filed: Jun. 10, 2004

(65) Prior Publication Data

US 2004/0252283 A1    Dec. 16, 2004

(30) Foreign Application Priority Data

Jun. 13, 2003    (JP)    ............... 2003-170109

(51) Int. Cl.
*G03B 21/00* (2006.01)
*G03B 21/14* (2006.01)
*H04N 3/22* (2006.01)
*H04N 3/26* (2006.01)

(52) U.S. Cl. ........................... 353/70; 348/745

(58) Field of Classification Search ............ 353/69–70; 348/745, 806

See application file for complete search history.

(56) References Cited

U.S. PATENT DOCUMENTS

| | | | |
|---|---|---|---|
| 5,455,647 A * | 10/1995 | Fujiwara | .................. 353/69 |
| 6,230,070 B1 | 5/2001 | Yodoshi | |
| 6,310,662 B1 | 10/2001 | Sunakawa et al. | |
| 6,499,849 B1 | 12/2002 | Huang | |
| 6,520,647 B2 | 2/2003 | Raskar | |
| 6,522,393 B2 * | 2/2003 | Higashino | ................ 356/3.03 |
| 6,741,279 B1 | 5/2004 | Allen | |
| 6,846,081 B2 * | 1/2005 | Mochizuki et al. | ............ 353/70 |
| 6,862,086 B2 | 3/2005 | Kanemitsu | |
| 6,877,864 B1 | 4/2005 | Tamura et al. | |
| 2002/0021418 A1 | 2/2002 | Raskar | |
| 2002/0038462 A1 | 3/2002 | Sakakibara et al. | |
| 2002/0051095 A1 | 5/2002 | Su | |
| 2002/0135747 A1 | 9/2002 | Higashino | |
| 2003/0043303 A1 | 3/2003 | Karuta et al. | |
| 2003/0095239 A1 | 5/2003 | Hirao et al. | |
| 2004/0061848 A1 | 4/2004 | Kanemitsu et al. | |
| 2004/0156033 A1 | 8/2004 | Kanemitsu et al. | |
| 2005/0012907 A1 | 1/2005 | Inoue | |
| 2005/0024598 A1 | 2/2005 | Inoue | |
| 2005/0052620 A1 | 3/2005 | Tamura | |

(Continued)

FOREIGN PATENT DOCUMENTS

EP    0 689 353 A2    12/1995

(Continued)

*Primary Examiner*—Christopher Mahoney
(74) *Attorney, Agent, or Firm*—Frishauf, Holtz, Goodman & Chick, P.C.

(57) ABSTRACT

A projector includes two range sensors of a phase difference method. The range sensors are laid out near a projection lens in such a way that a line connecting the centers of two photo-sensor arrays incorporated in one of the range sensors crosses a line connecting the centers of two photo-sensor arrays incorporated in the other range sensors approximately at the right angles. A control section controls those range sensors to measure distances to a plurality of ranging points on a screen. The control section computes the tilt angle of the screen based on the measured distances and supplies the computed tilt angle to a trapezoid correcting section and an optical mechanism section.

17 Claims, 9 Drawing Sheets

U.S. PATENT DOCUMENTS

| | | |
|---|---|---|
| 2005/0078282 A1 | 4/2005 | Tamura |
| 2005/0163396 A1 | 7/2005 | Morichika et al. |
| 2005/0168706 A1 | 8/2005 | Sakai |

FOREIGN PATENT DOCUMENTS

| | | |
|---|---|---|
| EP | 0 974 811 A | 1/2000 |
| EP | 1 193 541 A2 | 4/2002 |
| EP | 1 391 778 A | 2/2004 |
| EP | 1 426 732 A1 | 6/2004 |
| JP | 04-355740 A | 12/1992 |
| JP | 08-009309 A | 1/1996 |
| JP | 09-197249 Y | 7/1997 |
| JP | 2001-230991 A1 | 8/2001 |
| JP | 2001-339671 A | 12/2001 |
| JP | 2002-062842 A | 2/2002 |
| JP | 2003-029201 A | 1/2003 |
| WO | WO 00/2182 A1 | 4/2000 |
| WO | WO 02/101443 A2 | 12/2002 |
| WO | WO 03/017655 A1 | 2/2003 |

\* cited by examiner

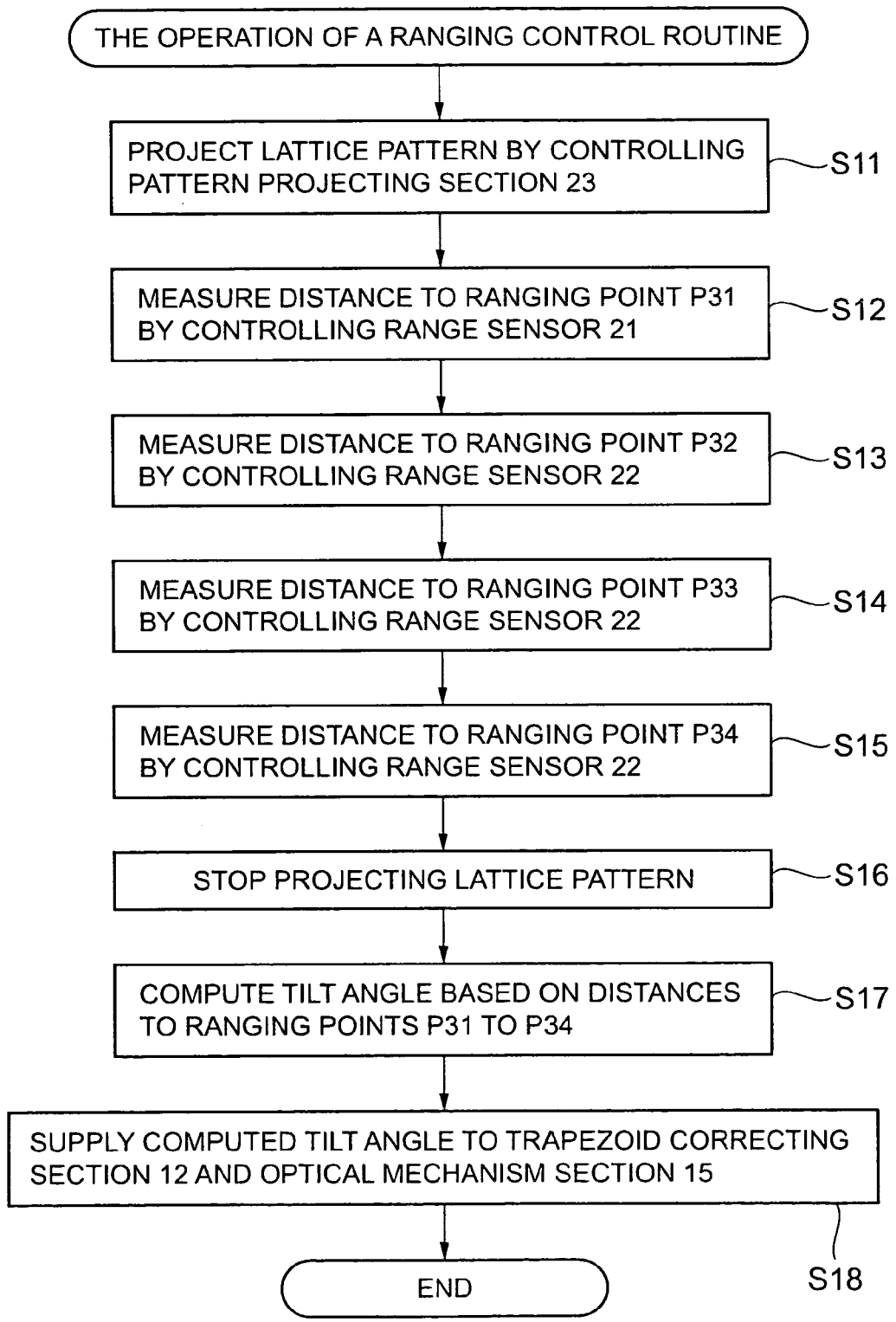

PROJECTOR WITH TILT-ANGLE DETECTING CAPABILITY

BACKGROUND OF THE INVENTION

1. Field of the Invention

The present invention relates to a projector.

2. Description of the Related Art

A projector (optical projector) projects light onto a screen (surface subject to light projection) and forms an image on the screen. Unless the optical axis of projected light to the screen from the projector is perpendicular to the surface of the screen, therefore, a distorted image is projected on the screen. To avoid such distortion, ordinary projectors are so designed as to detect the tilt angle of the screen surface with respect to the optical axis of projected light and corrects a video image based on the detected angle to thereby project a distortion-free video image.

One of conventional projectors capable of correcting a video image to eliminate its distortion is, for example, a projector which employs the technique disclosed in Unexamined Japanese Patent Application KOKAI Publication No. 2001-339671 (page 3 and FIG. 1). This projector preacquires information on the angle of a screen and sets the acquired information on the angle of the screen as an offset value with respect to the detected horizontal and vertical angles of the projector.

The conventional projector requires that the angle of the screen should be set beforehand in order to correct distortion of a video image. There may however a case where the angle of the screen is unclear or the acquired angle of the screen is wrong at the time a projector projects an image. In such a case, the tilt angle of the screen with respect to the optical axis of projected light from the projector is inaccurate. Therefore, the distortion correction of the conventional projector alone may not be able to accurately correct a video image to eliminate its distortion. If the angle of the screen is inaccurate, it is not possible to correct a video image to eliminate its distortion. Nor is it possible to accurately set the focus of projected light from the projector.

SUMMARY OF THE INVENTION

Accordingly, it is an object of the invention to provide a projector capable of precisely measuring the tilt angle of the optical axis projected light with respect to a screen.

It is another object of the invention to provide a projector capable of accurately correcting distortion of a video image using information on a measured tilt angle.

It is a further object of the invention to provide a projector that can accurately set the focus of projected light based on information on a measured tilt angle.

According to one aspect of the invention, there is provided a projector with a tilt-angle detecting capability that projects light to form an image on a surface of a screen, and comprises:

a tilt-angle detecting apparatus which detects a tilt angle of the surface of the screen with respect to an optical axis of light projected by the projector, and includes a plurality of distance measuring sections each of which has at least two light receiving sections and an image forming lens and measures distances to a plurality of distance-measuring points on the screen, a control section which controls the plurality of distance measuring sections to measure the distances to the plurality of distance-measuring points on the screen, and a tilt-angle acquiring section which acquires the tilt angle of the surface of the screen with respect to the optical axis of the light projected onto the screen based on at least three measured distances measured as the control section controls the plurality of distance measuring sections, wherein each of the distance measuring sections a distance by detecting a phase difference, and the plurality of distance measuring sections are laid out in such a way that lines, as baselines, each connecting incidence centers of the associated light receiving sections cross one another.

According to another aspect of the invention, there is provided a projector with a tilt-angle detecting capability that projects light to form an image on a surface of a screen, and comprises:

a tilt-angle detecting apparatus which detects a tilt angle of the surface of the screen with respect to an optical axis of light projected by the projector, and includes a distance measuring section which has at least three light receiving sections and an image forming lens, is laid out in such a way that lines each connecting incidence centers of the associated light receiving sections cross one another, and measures distances to a plurality of distance-measuring points on the screen based on a phase difference, a control section which controls the distance measuring section to measure the distances to the plurality of distance-measuring points on the screen, and a tilt-angle acquiring section which acquires the tilt angle of the surface of the screen with respect to the optical axis of the projected light based on at least three measured distances measured as the control section controls the distance measuring section.

According to a different aspect of the invention, there is provided a projector with a tilt-angle detecting capability that projects light to form an image on a surface of a screen, and comprises:

a tilt-angle detecting apparatus which detects a tilt-angle of the surface of the screen with respect to an optical axis of light projected by the projector; and a correcting section which corrects distortion of a video image caused by inclination of the screen based on the tilt angle detected by the tilt-angle detecting apparatus that includes a plurality of distance measuring sections each of which has at least two light receiving sections and an image forming lens and measures distances to a plurality of distance-measuring points on the screen, a control section which controls the plurality of distance measuring sections to measure the distances to the plurality of distance-measuring points on the screen, and a tilt-angle acquiring section which acquires the tilt angle of the surface of the screen with respect to the optical axis of the light projected onto the screen based on at least three measured distances measured as the control section controls the plurality of distance measuring sections, wherein each of the distance measuring sections a distance by detecting a phase difference, and the plurality of distance measuring sections are laid out in such a way that lines, as baselines, each connecting incidence centers of the associated light receiving sections cross one another.

According to a further aspect of the invention, there is provided a projector with a tilt-angle detecting capability that projects light to form an image on a surface of a screen, and comprises:

a tilt-angle detecting apparatus which detects a tilt angle of the surface of the screen with respect to an optical axis of light projected by the projector; and a focus control section which controls focusing by controlling an attitude of a projection lens for forming an image on the screen, based on the tilt angle detected by the tilt-angle detecting apparatus that includes a plurality of distance measuring sections each of which has at least two light receiving sections and an image forming lens and measures distances to a plurality of distance-measuring points on the screen, a control section which controls the plurality of distance measuring sections to measure the distances to the plurality of distance-measuring points on the screen, and a tilt-angle acquiring section which acquires the tilt angle of the surface of the screen with respect to the optical axis of the light projected onto the screen based on at least three measured distances measured as the control section controls the plurality of distance measuring sections, wherein each of the distance measuring sections a distance by detecting a phase difference, and the plurality of distance measuring sections are laid out in such a way that lines, as baselines, each connecting incidence centers of the associated light receiving sections cross one another.

BRIEF DESCRIPTION OF THE DRAWINGS

These objects and other objects and advantages of the present invention will become more apparent upon reading of the following detailed description and the accompanying drawings in which:

FIG. 7 is a flowchart illustrating the operation of a ranging control routine which is performed by a control section in FIG. 1;

DETAILED DESCRIPTION OF THE PREFERRED EMBODIMENT

A projector according to a preferred embodiment of the invention will now be described with reference to the accompanying drawings.

Figure 1:
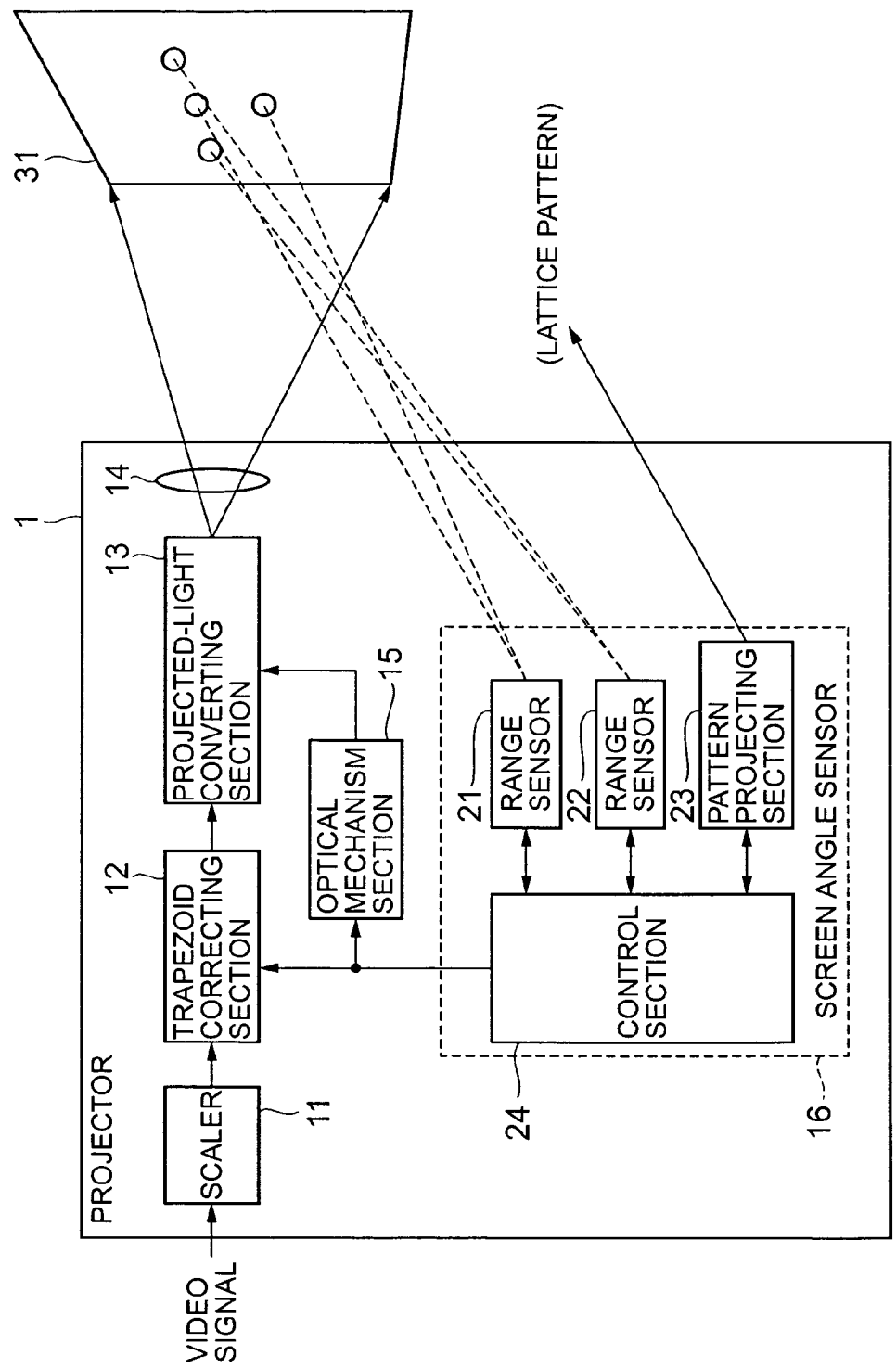
FIG. 1 is a block diagram showing the structure of a projector according to one embodiment of the invention.

The structure of the projector according to the embodiment is illustrated in FIG. 1.

The projector 1 according to the embodiment comprises a scaler 11, a trapezoid correcting section 12, a projected-light converting section 13, an image forming lens 14, an optical-mechanism section 15 and a screen angle sensor 16.

The scaler 11 adjusts the resolution of a video signal.

The trapezoid correcting section 12 corrects trapezoidal distortion (distortion to change a rectangular image to a trapezoidal image) with respect to the video signal whose resolution is adjusted by the scaler 11. Specifically, first, the trapezoid correcting section 12 extracts a corrected projection image from the projection image that is projected on a screen 31 based on the tilt angle of the screen 31 with respect to the optical axis of light to be projected on the screen 31 by the projector 1. Then, the trapezoid correcting section 12 time-sequentially performs projective transformation of the video signal to execute trapezoidal correction (correction of trapezoidal distortion).

The projected-light converting section 13 performs inverse transformation on the projection image corrected by the trapezoid correcting section 12.

The image forming lens 14 forms the image, inversely transformed by the projected-light converting section 13, on the surface of the screen 31.

The optical mechanism section 15 controls the focusing or so of the image forming lens 14 based on information on the tilt angle of the screen 31 that is detected by the screen angle sensor 16.

The screen angle sensor 16 detects the tilt angle of the surface of the screen 31 to be subjected to light projection with respect to the optical axis of light to be projected onto the screen 31 by the projector 1. The screen angle sensor 16 includes range sensors 21 and 22, a pattern projecting section 23 and a control section 24.

Each of the range sensors 21 and 22 measures (ranges) the distances among a plurality of ranging (distance-measuring) points on the surface of the screen 31.

Figure 2:
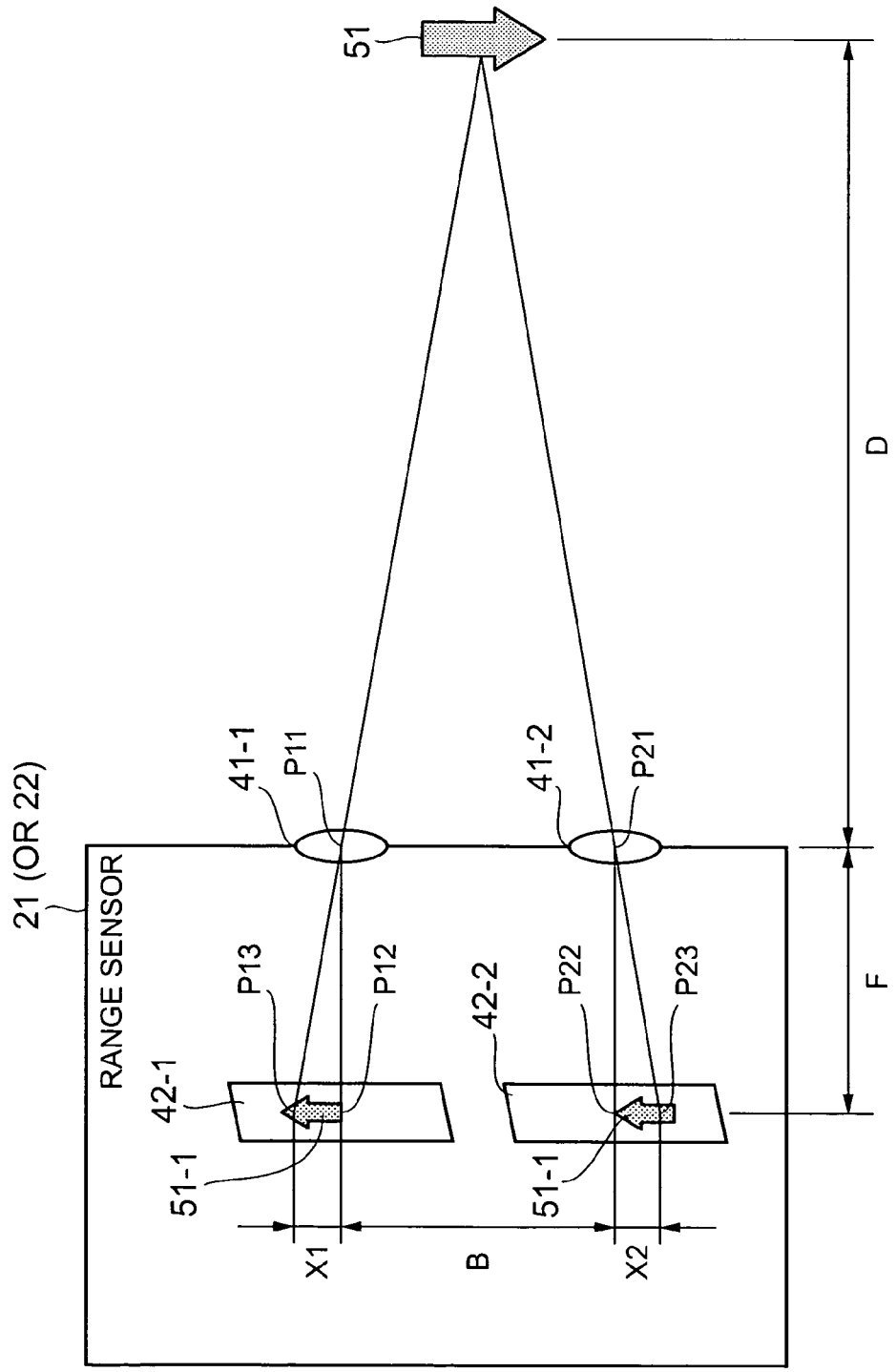
FIG. 2 is an explanatory diagram showing the structure of a range sensor in FIG. 1.
Figure 3:
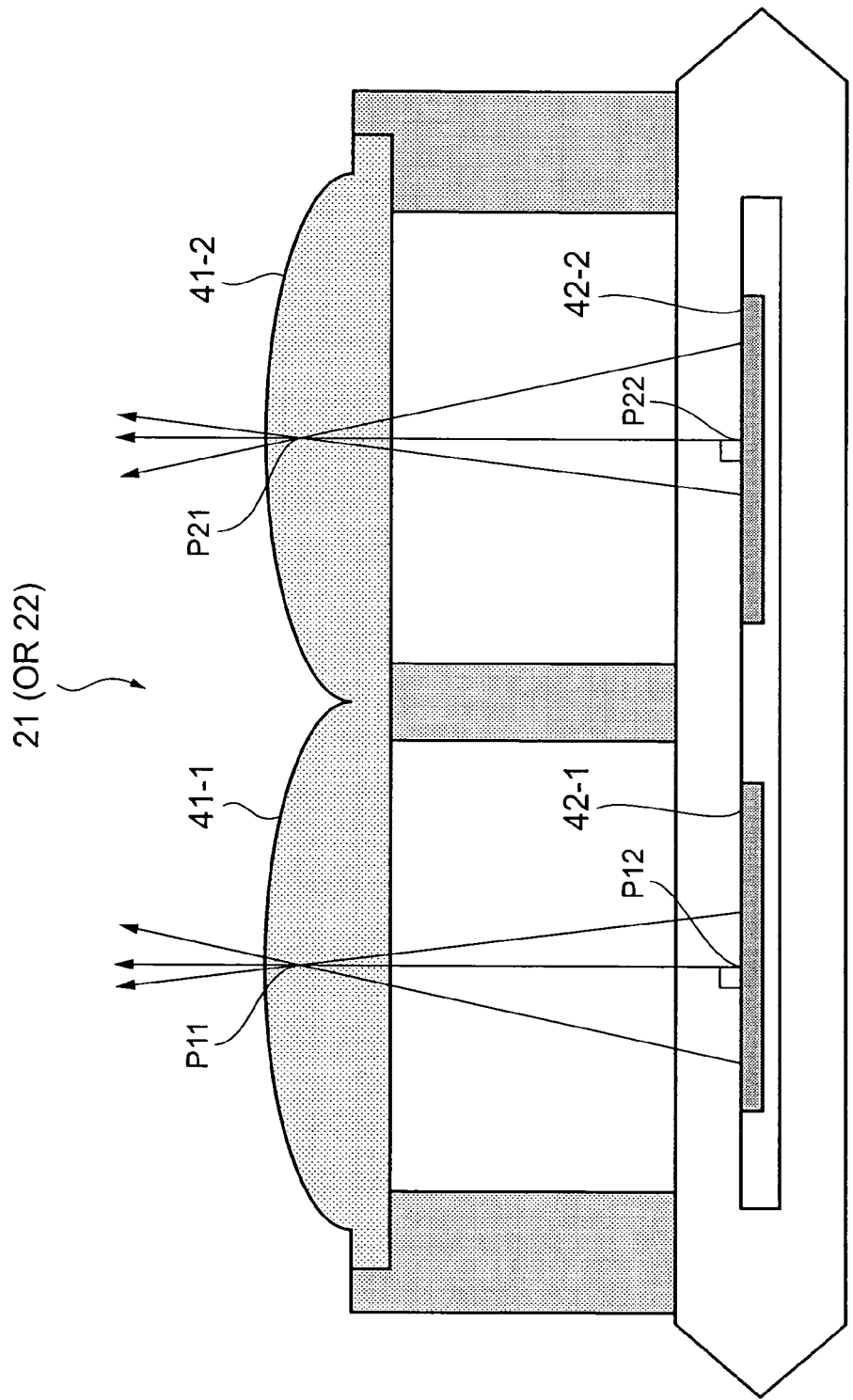
FIG. 3 is a cross-sectional view showing the structure of the range sensor in FIG. 1.

As shown in FIGS. 2 and 3, each of the range sensors 21 and 22 is a distance-measuring sensor of a phase difference method, which is comprised of an AF (Auto Focus) module or so. The "phase difference method" is a distance-measuring method which computes a distance to a target based on the relative positional deviation (phase difference) of a pair of video signals detected by a pair of sensors. The range sensor 21 has lenses 41-1 and 41-2 and photo-sensor arrays 42-1 and 42-2. The range sensor 22 has the same structure as the range sensor 21.

As shown in FIG. 2, with a subject 51 taken as a ranging point, the lenses 41-1 and 41-2 serve to form the image of the subject 51 on the detection surfaces of the photo-sensor arrays 42-1 and 42-2, respectively.

Each of the photo-sensor arrays 42-1 and 42-2 detects the image of the subject 51 formed on its detection surface and outputs the detection signal as an electric signal. The photo-sensor arrays 42-1 and 42-2 in the range sensor 21 are equivalent to the light receiving sections.

The lens surface of the lens 41-1 and the detection surface of the photo-sensor array 42-1 are laid out in parallel to each other. Let P11 be the center point of the lens 41-1. Let P12 be a point of intersection at which the center axis of the lens 41-1 that passes the point P11 perpendicularly intersects the detection surface of the photo-sensor array 42-1. Let P13 be a point at which an image 51-1 of the subject 51 is formed. Further, let X1 be the deviation of the point P13 from the point P12.

It is assumed that a distance F between the lens surface of the lens 41-1 and the detection surface photo-sensor array 42-1 is preset to a predetermined value by a user or so.

The lens 41-2 and the photo-sensor array 42-2 have the same structures as the lens 41-1 and the photo-sensor array 42-1, respectively. Let P21 be the center point of the lens 41-2, let P22 be a point of intersection at which the center axis of the lens 41-2 that passes the point P21 perpendicularly intersects the detection surface of the photo-sensor array 42-2. Let P23 be a point at which the image 51-1 of the subject 51 is formed. Further, let X2 be the deviation of the point P23 from the point P22. Also, let B be the distance between the point P12 and the point P22.

The triangle given by the subject 51, the point P11 and the point P21, the triangle given by the point P11 to P13,. and the triangle given by the point P21 to P23 are similar to one another. As apparent from the above, a distance D between the subject 51 and the range sensor 21 is given by the following equation 1.

$$d = \frac{(B \times f)}{(x1 + x2)} \quad (1)$$

The range sensors 21 and 22 performs the arithmetic operation of the equation 1 based on the values of the deviations X1 and X2 to compute the distance to the subject 51.

Figure 4:
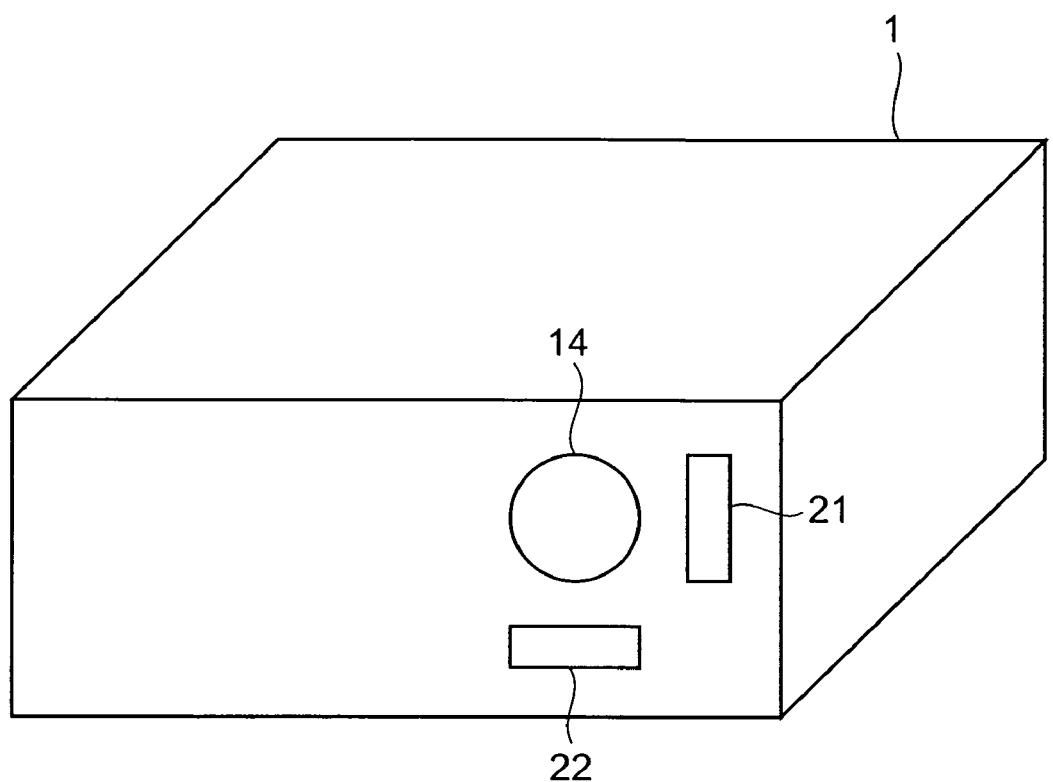
FIG. 4 is a perspective view illustrating the appearance of the projector in FIG. 1.

The range sensors 21 and 22 are laid out near the image forming lens 14 as shown in FIG. 4.

The range sensors 21 and 22 are laid out in such a way that a line (baseline) connecting the points P12 and P22 of the range sensor 21 is approximately perpendicular to a line (baseline) connecting the points P12 and P22 of the range sensor 22.

Figure 5:
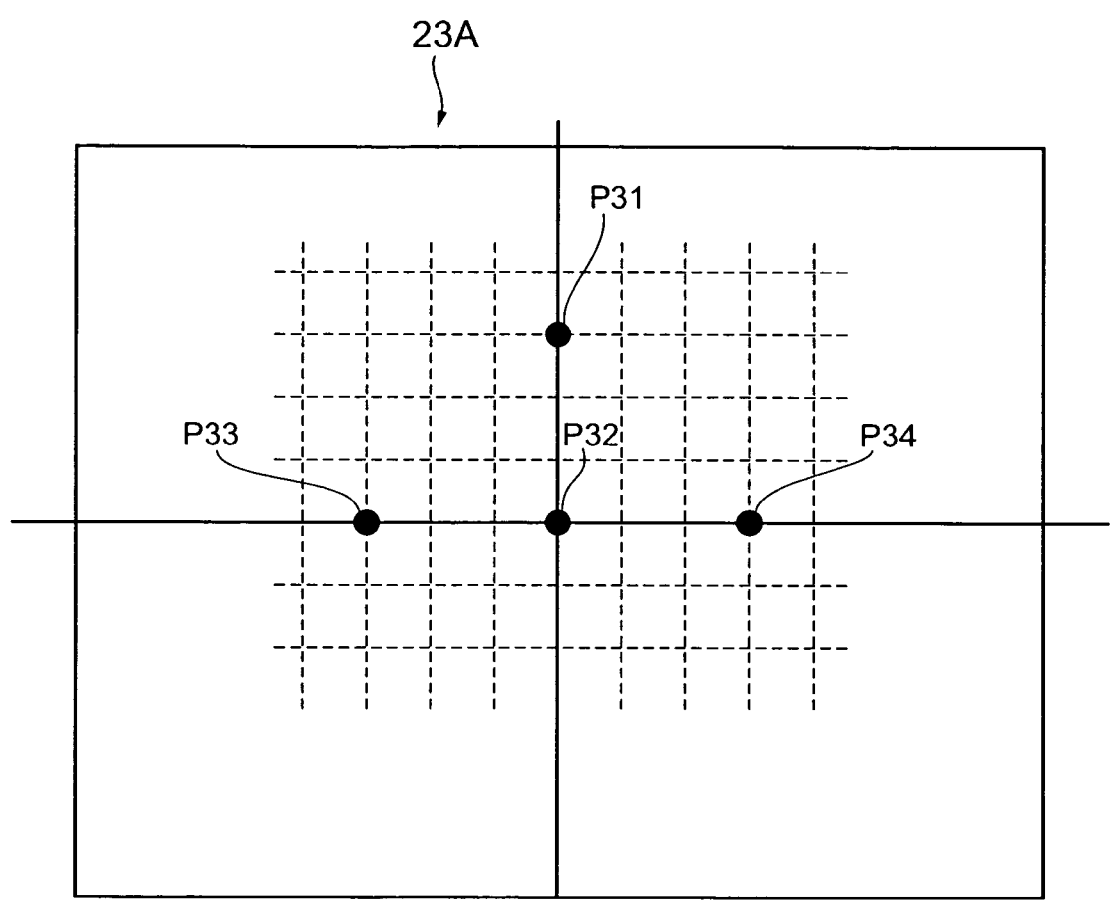
FIG. 5 is an explanatory diagram showing ranging points on a screen in FIG. 1.

The pattern projecting section 23 stores a lattice pattern 23A as shown in FIG. 5. The pattern projecting section 23 projects the lattice pattern 23A so that the range sensors 21 and 22 can detect a plurality of points on the screen 31.

The control section 24 acquires the tilt angle of the screen 31 with respect to the optical axis of projected light from the projector 1. The control section 24 controls the range sensors 21 and 22 to measure the distances between the projector 1 and plural points on the screen 31. Then, the control section 24 acquires the tilt angle based on information on the distances measured by the range sensors 21 and 22.

The control section 24 controls the range sensor 21 in such a way that the range sensor 21 measures the distances to points P31 and P32 on the screen 31 as shown in FIG. 5. The control section 24 controls the range sensor 22 in such a way that the range sensor 21 measures the distances to points P33 and P34 on the screen 31. Then, the control section 24 sets the points P31 to P34 in such a way that a line connecting the points P31 and P32 is perpendicular to a line connecting the points P33 and P34, then controls the range sensors 21 and 22.

The control section 24 acquires the tilt angle of the screen 31 with respect to the optical axis of projected light from the projector 1 based on the obtained individual distances to the points P31 to P34.

Figure 6:
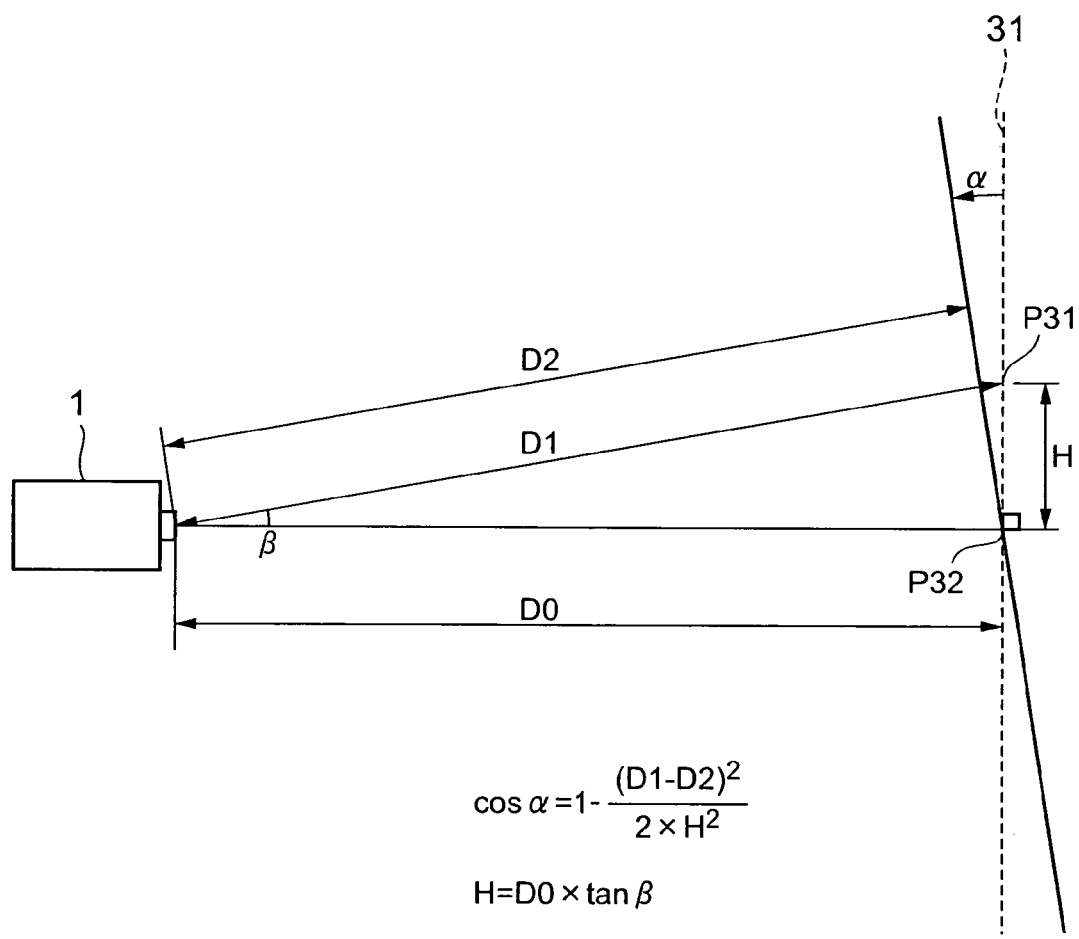
FIG. 6 is an explanatory diagram showing the contents of computation of the tilt angle of the screen in FIG. 1.

In case of computing the vertical tilt angle of the screen 31, if the screen 31 is inclined about the point P32 by an angle α, the tilt angle α is given by the following equation 2 using the cosine theorem as shown in FIG. 6 where H is the distance between the points P31 and P32 and H=tan β×D0.

$$\cos \alpha = 1 - \frac{(d1 - d2)^2}{2 \times h^2} \quad (2)$$

The control section 24 performs an arithmetic operation according to the equation 2 to acquire the vertical tilt angle α.

Likewise, the acquires the horizontal tilt angle of the screen 31 with respect to the optical axis of projected light from the projector 1 based on the measured individual distances to the points P33 and P34 as done in the case of acquiring the vertical inclination.

The control section 24 supplies information on the acquired tilt angle α to the trapezoid correcting section 12 and the optical mechanism section 15.

The operation of the projector 1 according to the embodiment will be explained below.

The screen angle sensor 16 detects the tilt angle α of the surface of the screen 31 with respect to the optical axis of light projected by the projector 1. This operation is described referring to a flowchart shown in FIG. 7.

The control section 24 controls the pattern projecting section 23 to project the lattice pattern 23A as shown in FIG. 5 on the screen 31 (step S11).

The control section 24 controls the range sensor 21 to measure the distance to the ranging point P31 (step S12).

The control section 24 controls the range sensor 21 to measure the distance to the ranging point P32 (step S13).

The control section 24 controls the range sensor 22 to measure the distance to the ranging point P33 (step S14).

The control section 24 controls the range sensor 22 to measure the distance to the ranging point P34 (step S15).

The control section 24 controls the pattern projecting section 23 to stop projecting the lattice pattern 23A (step S16).

Based on the measured distances to the ranging points P31 to P34, the control section 24 performs an arithmetic operation to compute the tilt angle α (step S17).

The control section 24 supplies the value of the acquired tilt angle α to the trapezoid correcting section 12 and the optical mechanism section 15 (step S18), then terminates the ranging control routine.

When the ranging control routine is terminated, the scaler 11 adjusts the resolution of a video signal and supplies the video signal to the trapezoid correcting section 12.

Figure 8A:
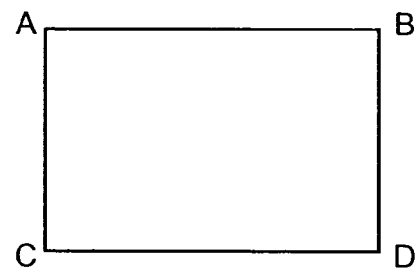
FIGS. 8A to 8C are explanatory diagrams illustrating the operations of a trapezoid correcting section and a projected-light converting section ranging control in FIG. 1.

It is assumed here that the video signal represents a rectangular ABCD as shown in FIG. 8A. The trapezoid correcting section 12 performs trapezoidal correction on the rectangular ABCD based on the tilt angle α supplied from the screen angle sensor 16. Through the trapezoidal correction done by the trapezoid correcting section 12, the rectangular ABCD shown in FIG. 8A becomes a rectangular P-1Q-1R-1S-1 as shown in FIG. 8B.

Figure 8B:
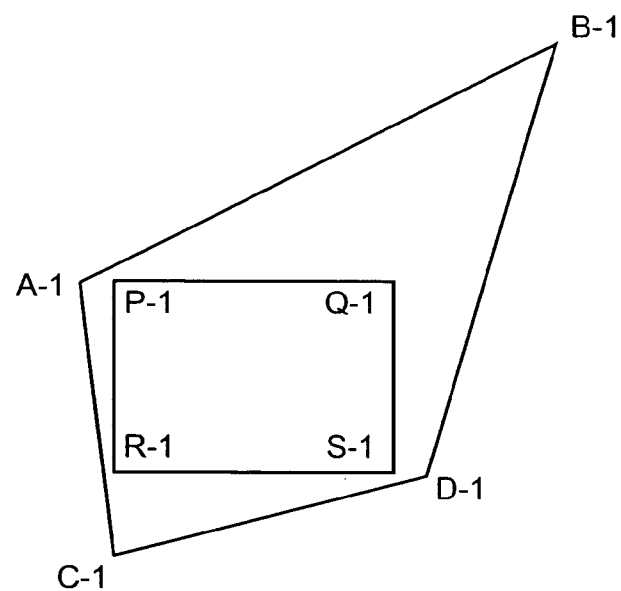
Figure 8C:
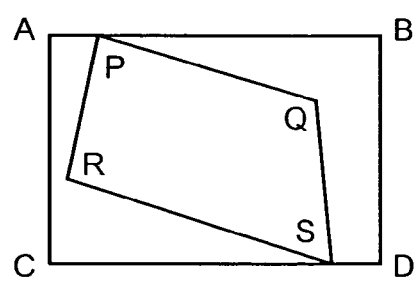

The projected-light converting section 13 performs inverse transformation on the rectangular P-1Q-1R-1S-1 as shown in FIG. 8B, generating a rectangular PQRS as shown in FIG. 8C.

The optical mechanism section 15 controls the focus or so of the image forming lens 14 based on the tilt angle α supplied from the screen angle sensor 16.

As the projector 1 projects the rectangular PQRS as shown in FIG. 8C on the screen 31 via the focus-controlled image forming lens 14, the image of the rectangular ABCD as shown in FIG. 8A is formed on the screen 31.

As apparent from the above, the projector 1 according to the embodiment has two range sensors 21 and 22 of the phase difference method. The range sensors 21 and 22 are laid out in such a way that the line connecting the center points of the photo-sensor arrays 42-1 and 42-2 incorporated in the photo-sensor array 21 and the line connecting the center points of the photo-sensor arrays 42-1 and 42-2 incorporated in the other photo-sensor array 22 at the right angles. Further, the range sensors 21 and 22 measure the distances to the ranging points P31 to P34 on the screen 31.

Therefore, the projector 1 according to the embodiment can accurately detect the tilt angle α of the screen 31 with respect to the optical axis of projected light from the projector 1. In addition, trapezoidal correction can accurately correct a video image to eliminate its distortion, so that the focus of the image forming lens 14 can be set precisely.

The invention can be worked out in various modes and is in no way limited to the embodiment discussed above.

Although the projector 1 according to the embodiment has two range sensors, for example, the quantity is not restrictive and the projector 1 may be designed to have three or more range sensors.

Although there are four ranging points set on the screen 31 in the embodiment, the number is not restrictive and may be five or greater, or may be three. For example, given that a single ranging point corresponds to one of the range sensors 21 and 22 and two ranging points correspond to the other sensor, a total of three ranging points are provided. In this case, however, the third ranging point is set at a position apart from a line connecting the other two ranging points. Then, the trapezoid correcting section 12 can perform trapezoidal correction using information on those three ranging points (information on the measured distances). The optical mechanism section 15 can set the adequate focus using the invention on the three ranging points.

Figure 9:
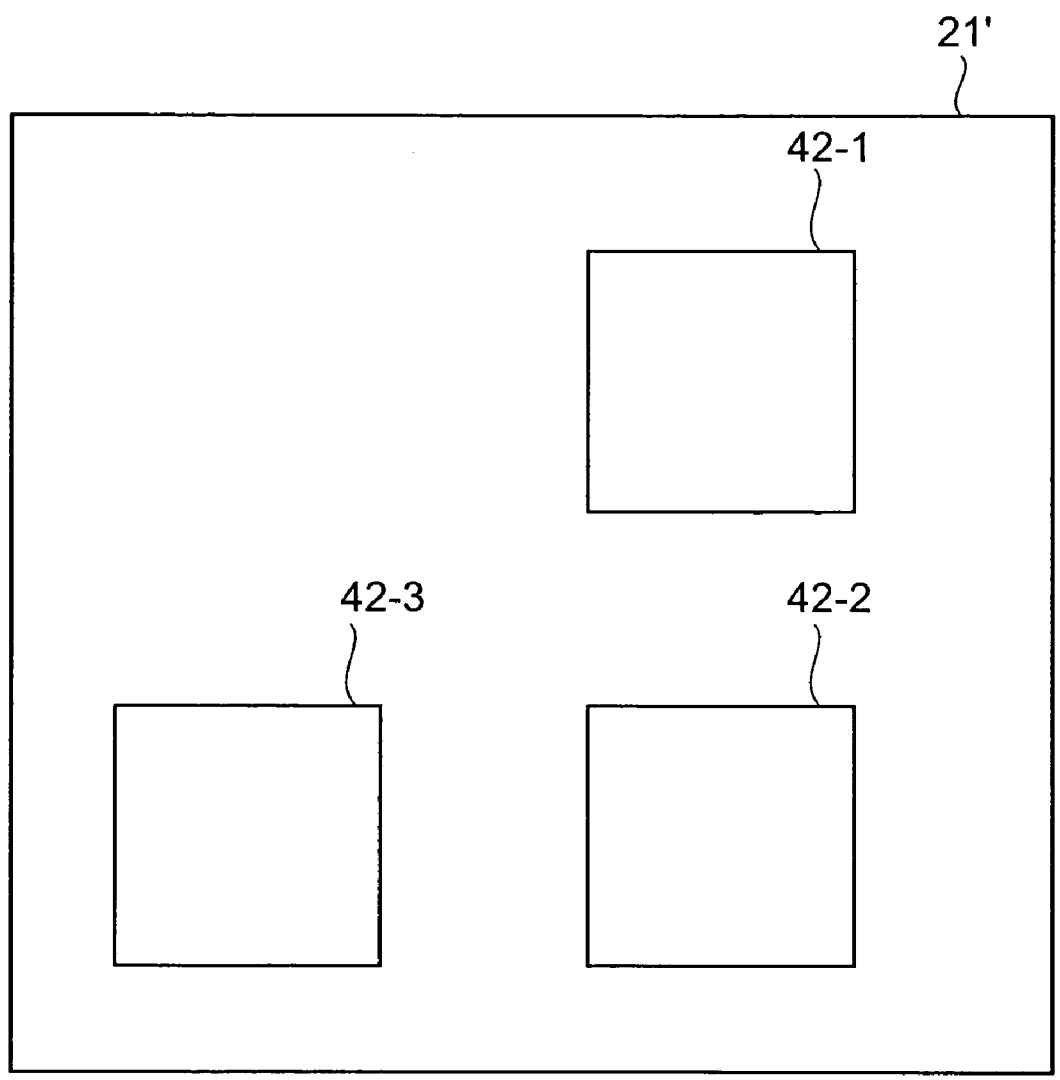
FIG. 9 is a plan view showing an application example of the range sensor in FIG. 1.

Further, the projector may be constructed in such a way that, as shown in FIG. 9, one of the range sensors (range sensor 21') has three photo-sensor arrays 42-1, 42-2 and 42-3 as light receiving sections.

In this case, the control section 24 controls the photo-sensor arrays 42-1 and 42-2 to measure the individual distances to the points P31 and P32 on the screen 31, and controls the photo-sensor arrays 42-3 and 42-2 to measure the individual distances to the points P33 and P34.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2003-170109 filed on Jun. 13, 2003 and including specification, claims, drawings and summary. The disclosure of the above Japanese Patent Application is incorporated herein by reference in its entirety.

What is claimed is:

1. A projector which projects light to form an image on a surface of a screen and has a tilt-angle detecting capability, said projector comprising:

a projection lens through which the light for forming the image on the screen is projected;

a focus control section which controls focusing of the projection lens; and a tilt-angle detecting unit which detects a tilt angle of said surface of said screen with respect to an optical axis of light projected by said projector, said tilt-angle detecting unit comprising:

a plurality of distance measuring sections, each of which includes at least two light receiving sections and at least two lenses, and which measure distances to a plurality of distance-measuring points on said screen;

a control section which controls said plurality of distance measuring sections to measure said distances to said plurality of distance-measuring points on said screen; and a tilt-angle acquiring section which acquires said tilt angle of said surface of said screen with respect to said optical axis of said light projected onto said screen based on at least three measured distances measured by said plurality of distance measuring sections as controlled by the control section;

wherein each of said distance measuring sections performs distance measuring by detecting a phase difference;

wherein said plurality of distance measuring sections are laid out adjacent to the projection lens such that respective baselines of the plurality of distance measuring sections are adjacent to a circumference of the projection lens and cross each other, said baselines being lines connecting incidence centers of the associated light receiving sections of the distance measuring sections; and wherein the focus control section controls the focusing based on at least one of the distances measured by at least one of the distance measuring sections.

2. The projector according to claim 1, wherein each of said distance measuring sections measures the distance to at least one said distance-measuring point on said screen based on deviations of an image forming point on each of said light receiving sections of the distance measuring section from the incidence centers of the light receiving sections, when an image of said distance-measuring point is formed on said screen by said projection lens.

3. The projector according to claim 1, wherein said control section selects said plurality of distance-measuring points on said screen such that at least one of said distance measuring points is at a position apart from a line connecting at least two other distance-measuring points.

4. The projector according to claim 1, wherein said tilt-angle detecting unit detects at least one of a vertical tilt angle of said screen and a horizontal tilt angle said screen based on the distances measured by said distance measuring sections.

5. The projector according to claim 1, further comprising a trapezoid correcting section which corrects trapezoidal distortion of an image to be projected based on said tilt angle detected by said tilt-angle detecting unit.

6. The projector according to claim 1, further comprising a pattern-image projecting section which projects a pattern image, which includes a plurality of points identifiable on said screen, on said screen; and wherein said distance measuring sections measure the distances based on said pattern image projected on said screen.

7. The projector according to claim 1, wherein each of the plurality of distance measuring sections measures distances to a plurality of the distance-measuring points that are located on a line parallel with the baseline thereof.

8. A projector which projects light to form an image on a surface of a screen and has a tilt-angle detecting capability, said projector comprising:
   a projection lens through which the light for forming the image on the screen is projected;
   a focus control section which controls focusing of the projection lens; and
   a tilt-angle detecting unit which detects a tilt angle of said surface of said screen with respect to an optical axis of light projected by said projector, said tilt-angle detecting unit comprising:
      a distance measuring section which includes at least four light receiving sections and at least four lenses, and which measures distances to a plurality of distance-measuring points on said screen based on a phase difference;
      a control section which controls said distance measuring section to measure said distances to said plurality of distance-measuring points on said screen; and
      a tilt-angle acquiring section which acquires said tilt angle of said surface of said screen with respect to said optical axis of said projected light based on at least three measured distances measured said distance measuring section as controlled by the control section;
   wherein the distance measuring section is adjacent to the projection lens, and the light receiving sections are arranged such that at least two lines, each of which connects incidence centers of at least two of the light receiving sections, are adjacent to a circumference of the projection lens and cross one another; and
   wherein the focus control section controls the focusing based on at least one of the distances measured by the distance measuring section.

9. The projector according to claim 8, wherein said distance measuring section measures the distance to each said distance-measuring point on said screen based on deviations of an image forming point on each of said light receiving sections of the distance measuring section from the incidence centers of the light receiving sections, when an image of said distance-measuring point is formed on said screen by said projection lens.

10. The projector according to claim 8, further comprising a trapezoid correcting section which corrects trapezoidal distortion of an image to be projected based on said tilt angle detected by said tilt-angle detecting unit.

11. The projector according to claim 8, further comprising a pattern-image projecting section which projects a pattern image, which includes a plurality of points identifiable on said screen, on said screen; and
   wherein said distance measuring section measures the distances based on said pattern image projected on said screen.

12. The projector according to claim 8, wherein the at least two light receiving sections located on each said line are used in measuring distances to a plurality of the distance measuring points that are located on a line parallel with the line connecting the incidence centers the at least two light receiving sections.

13. A projector which projects light to form an image on a surface of a screen and has a tilt-angle detecting capability, said projector comprising:
   a projection lens through which the light for forming the image on the screen is projected;
   a focus control section which controls focusing of the projection lens;
   a tilt-angle detecting unit which detects a tilt angle of said surface of said screen with respect to an optical axis of light projected by said projector; and
   a correcting section which corrects distortion of a projected image caused by inclination of said screen based on said tilt angle detected by said tilt-angle detecting unit;
   wherein the tilt-angle detecting unit comprises:
      a plurality of distance measuring sections, each of which includes at least two light receiving sections and at least two lenses, and which measure distances to a plurality of distance-measuring points on said screen;
      a control section which controls said plurality of distance measuring sections to measure said distances to said plurality of distance-measuring points on said screen; and
      a tilt-angle acquiring section which acquires said tilt angle of said surface of said screen with respect to said optical axis of said light projected onto said screen based on at least three measured distances measured by said plurality of distance measuring sections as controlled by the control section;
   wherein each of said distance measuring sections performs distance measuring by detecting a phase difference; and
   wherein said plurality of distance measuring sections are laid out adjacent to the projection lens such that respective baselines of the plurality of distance measuring sections are adjacent to a circumference of the projection lens and cross each other, said baselines being lines connecting incidence centers of the associated light receiving sections of the distance measuring sections; and
   wherein the focus control section controls the focusing based on at least one of the distances measured by the distance measuring sections.

14. The projector according to claim 13, wherein each of said distance measuring sections measures the distance to at least one said distance-measuring point on said screen based on deviations of an image forming point on each of said light receiving sections of the distance measuring section from the incidence centers of the light receiving sections, when an image of said distance-measuring point is formed on said screen by said projection lens.

15. The projector according to claim 13, wherein said tilt-angle detecting unit detects at least one of a vertical tilt angle of said screen and a horizontal tilt angle of said screen based on the distances measured by said distance measuring sections.

16. The projector according to claim 13, further comprising a pattern-image projecting section which projects a pattern image, which includes a plurality of points identifiable on said screen, on said screen; and
   wherein said distance measuring sections measure the distances based on said pattern image projected on said screen.

17. The projector according to claim 13, wherein each of the plurality of distance measuring sections measures distances to a plurality of the distance-measuring points that are located on a line parallel with the baseline thereof.

* * * * *